US008316035B2

(12) United States Patent
Chen et al.

(10) Patent No.: US 8,316,035 B2
(45) Date of Patent: *Nov. 20, 2012

(54) SYSTEMS AND ARRANGEMENTS OF TEXT TYPE-AHEAD

(75) Inventors: Yen-Fu Chen, Austin, TX (US); Fabian F. Morgan, Austin, TX (US); Brian M. O'Connell, Cary, NC (US); Keith R. Walker, Austin, TX (US); Sarah V. White Eagle, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 746 days.

This patent is subject to a terminal disclaimer.

(21) Appl. No.: 12/015,361

(22) Filed: Jan. 16, 2008

(65) Prior Publication Data
US 2009/0182741 A1    Jul. 16, 2009

(51) Int. Cl.
*G06F 7/00* (2006.01)
*G06F 17/30* (2006.01)

(52) U.S. Cl. ...................................... 707/758
(58) Field of Classification Search .............. 707/758, 707/999.6, 999.1, 999.006; 715/255
See application file for complete search history.

(56) References Cited

U.S. PATENT DOCUMENTS

| | | | |
|---|---|---|---|
| 4,464,730 A | | 8/1984 | Lawrence et al. |
| 5,251,131 A | * | 10/1993 | Masand et al. ............. 704/9 |
| 5,623,406 A | * | 4/1997 | Ichbiah ................. 704/3 |
| 5,752,051 A | * | 5/1998 | Cohen ................... 704/1 |
| 5,772,585 A | | 6/1998 | Lavin et al. |
| 5,896,321 A | | 4/1999 | Miller et al. |
| 6,055,542 A | * | 4/2000 | Nielsen et al. ............ 1/1 |
| 6,131,092 A | * | 10/2000 | Masand ................. 1/1 |
| 6,208,339 B1 | * | 3/2001 | Atlas et al. ............. 715/780 |
| 6,377,965 B1 | | 4/2002 | Hachamovitch et al. |
| 6,564,213 B1 | * | 5/2003 | Ortega et al. ............ 1/1 |

(Continued)

FOREIGN PATENT DOCUMENTS

EP          1-109-115 A1  *  12/1999

(Continued)

OTHER PUBLICATIONS

Bast, Holger, et al., "Type Less, Find More: Fast Autocompletion search with a Succinct Index", SIGIR '06, Seattle, WA, Aug. 6-11, 2006, pp. 364-371.*

(Continued)

*Primary Examiner* — Aleksandr Kerzhner
(74) *Attorney, Agent, or Firm* — Schmeiser, Olsen & Watts; John Pivnichny

(57) ABSTRACT

Methods and arrangements of text entry are discussed. Embodiments include transformations, code, state machines or other logic to select segments of text from text files based upon the number of words in phrases of the text files, upon the number of letters in words of the text files, or upon other patterns of the text in the text files. The text files may include web sites and news indexes. Embodiments may also involve indexing the selected segments of text, matching text currently being entered by the user (current text) into an application to a portion of a segment of the indexed text, and entering a remaining portion of the segment of the indexed text into the application based upon the matching. In some embodiments, the matching may be based upon an attribute of text such as a time period, a source, or a recipient.

21 Claims, 4 Drawing Sheets

U.S. PATENT DOCUMENTS

| | | | |
|---|---|---|---|
| 6,631,373 B1 | 10/2003 | Otani et al. | |
| 6,678,694 B1* | 1/2004 | Zimmermann et al. | 1/1 |
| 6,816,578 B1 | 11/2004 | Kredo et al. | |
| 6,879,691 B1* | 4/2005 | Koretz | 380/255 |
| 7,003,446 B2* | 2/2006 | Trower et al. | 704/9 |
| 7,027,192 B2 | 4/2006 | Kawai | |
| 7,113,803 B2 | 9/2006 | Dehlin | |
| RE39,326 E* | 10/2006 | Comer et al. | 715/203 |
| 7,146,571 B2 | 12/2006 | Bates et al. | |
| 7,149,970 B1 | 12/2006 | Pratley et al. | |
| 7,181,497 B1 | 2/2007 | Appelman et al. | |
| 7,185,271 B2* | 2/2007 | Lee et al. | 715/226 |
| 7,293,231 B1 | 11/2007 | Gunn et al. | |
| 7,529,731 B2* | 5/2009 | Bier | 1/1 |
| 7,558,778 B2* | 7/2009 | Carus et al. | 1/1 |
| 7,558,792 B2* | 7/2009 | Bier | 1/1 |
| 7,650,348 B2 | 1/2010 | Lowles et al. | |
| 7,661,064 B2* | 2/2010 | Cicerone | 715/255 |
| 7,679,534 B2 | 3/2010 | Kay et al. | |
| 7,698,127 B2 | 4/2010 | Trower | |
| 7,702,731 B2 | 4/2010 | Lingafelt et al. | |
| 7,895,032 B2 | 2/2011 | Mullen | |
| 2002/0013705 A1 | 1/2002 | Jaepel et al. | |
| 2003/0033287 A1 | 2/2003 | Shanahan et al. | |
| 2003/0033288 A1* | 2/2003 | Shanahan et al. | 707/3 |
| 2003/0061200 A1 | 3/2003 | Hubert et al. | |
| 2003/0061201 A1 | 3/2003 | Grefenstette et al. | |
| 2003/0171910 A1 | 9/2003 | Abir | |
| 2004/0039988 A1* | 2/2004 | Lee et al. | 715/505 |
| 2005/0086596 A1* | 4/2005 | Koch et al. | 715/526 |
| 2005/0108630 A1* | 5/2005 | Wasson et al. | 715/513 |
| 2005/0132297 A1* | 6/2005 | Milic-Frayling et al. | 715/745 |
| 2005/0155017 A1 | 7/2005 | Berstis et al. | |
| 2005/0188330 A1 | 8/2005 | Griffin | |
| 2005/0289103 A1* | 12/2005 | Bier | 707/1 |
| 2005/0289141 A1 | 12/2005 | Baluja | |
| 2006/0074980 A1 | 4/2006 | Sarkar | |
| 2006/0080303 A1* | 4/2006 | Sargent et al. | 707/3 |
| 2006/0090154 A1 | 4/2006 | Bustelo et al. | |
| 2006/0106769 A1* | 5/2006 | Gibbs | 707/3 |
| 2006/0165289 A1* | 7/2006 | Boss et al. | 382/182 |
| 2006/0247915 A1 | 11/2006 | Bradford et al. | |
| 2007/0033217 A1* | 2/2007 | Basner | 707/102 |
| 2007/0033275 A1* | 2/2007 | Toivonen et al. | 709/224 |
| 2007/0050352 A1* | 3/2007 | Kim | 707/4 |
| 2007/0076862 A1 | 4/2007 | Chatterjee et al. | |
| 2007/0100890 A1* | 5/2007 | Kim | 707/104.1 |
| 2007/0133507 A1* | 6/2007 | Da Palma et al. | 370/352 |
| 2007/0208998 A1* | 9/2007 | Cicerone | 715/531 |
| 2007/0250504 A1* | 10/2007 | Chen et al. | 707/6 |
| 2007/0250765 A1* | 10/2007 | Chen et al. | 715/511 |
| 2007/0296615 A1* | 12/2007 | Raguseo | 341/51 |
| 2008/0010274 A1* | 1/2008 | Carus et al. | 707/5 |
| 2008/0021924 A1* | 1/2008 | Hall et al. | 707/103 X |
| 2008/0065617 A1* | 3/2008 | Burke et al. | 707/5 |
| 2008/0071708 A1* | 3/2008 | Dara et al. | 706/20 |
| 2008/0155464 A1 | 6/2008 | Jones et al. | |
| 2008/0243841 A1* | 10/2008 | Bonnet et al. | 707/6 |
| 2008/0263032 A1* | 10/2008 | Vailaya et al. | 707/6 |
| 2008/0263033 A1* | 10/2008 | Vailaya et al. | 707/6 |
| 2008/0270351 A1 | 10/2008 | Thomsen | |
| 2008/0270382 A1 | 10/2008 | Thomsen et al. | |
| 2008/0270451 A1 | 10/2008 | Thomsen et al. | |
| 2008/0320411 A1* | 12/2008 | Chen et al. | 715/780 |
| 2008/0320441 A1 | 12/2008 | Ahadian et al. | |
| 2009/0132234 A1 | 5/2009 | Weikel | |
| 2009/0182741 A1 | 7/2009 | Chen et al. | |
| 2009/0271700 A1* | 10/2009 | Chen et al. | 715/261 |
| 2010/0010989 A1* | 1/2010 | Li et al. | 707/5 |

FOREIGN PATENT DOCUMENTS

| | | |
|---|---|---|
| WO | 2004/010323 A2 | 1/2004 |
| WO | 2006/055120 A2 | 5/2006 |

OTHER PUBLICATIONS

Wusteman, Judith, et al., "Using Ajax to Empower Dynamic Searching", Information Technology and Libraries, vol. 25, No. 2, Jun. 2006, pp. 1-16.*

Bangalore, Anantha, et al., "UMLSKS SUGGEST: An Auto-complete Feature for the UMLSKS Interface Using AJAX", AMIA 2006 Symposium Proceedings, © 2006, p. 851.*

Hyvönen, Eero, et al., "Semantic Autocompletion", ASWC 200, LNCS 4185, Springer-Verlag, Berlin, Germany, © 2006, pp. 739-751.*

Kellar, Melanie, et al., "Using Web Browser Interactions to Predict Task", WWW 2006, Edinburgh, Scotland, May 23-26, 2006, pp. 843-844.*

"n-gram", Wikipedia, downloaded from: en.wikipedia.org/wiki/N-gram on Apr. 23, 2010, pp. 1-5.*

Dowman, Mike, et al., "Web-Assisted Annotation, Semantic Indexing and Search of Television and Radio News", WWW 2005, Chiba, Japan, May 10-14, 2005, pp. 225-233.*

Capra III, Robert G., et al., "Using Web Search Engines to Find and Refind Information", IEEE Computer, Oct. 2005, pp. 36-42.*

Vehviläinen, Antti, et al., "A Semi-Automatic Semantic Annotation and Authoring Tool for a Library Help Desk Service", Proc. of the 1st Semantic Authoring and Annotation Workshop (ISWC-2006), © 2006, pp. 1-9.*

Turney, Peter D., "Coherent Keyphrase Extraction via Web Mining", Proc. of IJCAI, © 2003, pp. 434-439.*

Lin, Shian-Hua, et al., "Discovering Informative Content Blocks from Web Documents", SIGKDD '02, Edmonton, Alberta, Canada, Jul. 23-26, 2002, pp. 588-593.*

"Using SureType?", http://www.blackberry.com/solutions/pdfs/suretype_blackberry_7100v.pdf; 2005 Research in Motion Limited, pp. 2.

Yen-Fu Chen et al., U. S. Patent Application entitled "Method of Text Type-Ahead," filed on Jun. 21, 2007, U.S. Appl. No. 11/766,193, pp. 32.

U.S. Appl. No. 12/111,191; filed Apr. 28, 2008; GAU 2178; Confirmation No. 6868.

Non-Final Office Action (Mail Date Jun. 24, 2011) for U.S. Appl. No. 12/111,191, filed Jun. 21, 2007; GAU 2178; Confirmation No. 6868.

Request for Continued Examination for U.S. Appl. No. 11/766,193; filed Mar. 21, 2011; Confirmation No. 8936.

PCT Written Opinion and International Search Report, from the International Searching Authority, International Application No. PCT/EP2009/050252, Aug. 8, 2009.

PCT Written Opinion and International Search Report, from the International Searching Authority, International Application No. PCT/EP2008/057537, Nov. 25, 2008.

Trnka, Yarrington, et al., "The Effects of Word Prediction on Communication Rate for AAC", NAACL-HLT, Rochester, NY, Apr. 2007, pp. 1-2.

Non-Final Office Action dated May 7, 2010 for U.S. Appl. No. 11/766,193.

Final Office Action dated Oct. 20, 2010 for U.S. Appl. No. 11/766,193.

Office Action (Mail Date Jan. 4, 2012) for U.S. Appl. No. 12/111,191, filed Jun. 21, 2007; Confirmation No. 6868.

Final Office Action (Mail Date Jun. 18, 2012) for U.S. Appl. No. 12/111,191, filed Jun. 21, 2007; GAU 2178; Confirmation No. 6868.

Office Action (Mail Date Jun. 5, 2012) for U.S. Appl. No. 11/766,193, filed Jun. 21, 2007; GAU 2177; Confirmation No. 8936.

U.S. Appl. No. 13/603,884, filed Sep. 5, 2012; Confirmation No. 9107; First Named Inventor: Yen-Fu Chen.

* cited by examiner

SYSTEMS AND ARRANGEMENTS OF TEXT TYPE-AHEAD

FIELD

The present invention is in the field of text entry. More particularly, the present invention relates to methods and arrangements to auto-complete user-entered text.

BACKGROUND

Users of applications that accept text entry, such as Instant Message (IM) clients and email programs, often type keywords or phrases that they have previously typed or previously seen in a text document. For example, an IM user may use some words or phrases regularly. Examples include information about the user's availability such as, "Sorry, on a call right now, will ping you later"; "long" keywords or phrases, such as "polymorphism" or "IBM Tivoli Composite Application Manager (ITCAM)"; and a referral for a certain expertise. For instance, an IM user may type a message to another contact saying: "For the ABC problem in product XYZ, you can contact Joe Somebody, as he is the developer of that component. His short name is joesomebody@us.ibm.com". Similarly, a user may email or IM friends about a recently viewed web page.

In current applications that accept text entry, entering text that a user has previously typed or viewed may require manually performing a laborious and time-consuming series of steps. Below is an example of the manual method, in scenario in which a user repeatedly asks permission to use a resource:

[Danny→Brent]:
Danny: "Are you using the CCTDEV machine? It won't accept my connection because someone else is logged, on."
Brent: "No. Try checking with Dave,"
[Danny→Dave]
Danny: "Are you using the CCTDEV machine? It won't accept my connection because someone else is logged on."
Dave: "No. Try checking with Sherry and Eileen."
[Danny→Sherry/Eileen]
Danny: "Are you using the CCTDEV machine? It won't accept my connection because someone else is logged on."

In this scenario, Danny continues to ask the same question and provide the same explanation to other IM users. To avoid retyping, Danny may perform the typical steps of copying and pasting. These steps include:

1. Locate the previous text. Right click on the Contact name>Choose Show>Chat History. To execute this step, Danny must know the person he was chatting with and the location of the text within the chat.
2. Search for the chat history text.
3. Highlight the text.
4. Hit Ctrl-C to copy.
5. Go to the new chat window.
6. Paste the text.
7. Modify the text as necessary.
8. Hit ENTER to send message.

The above example described entering text a user had previously typed. The process of entering text from a text document that the user had recently viewed is similar. In particular, to use a phrase in a blog or web article requires locating the web page. In either case, the steps are time consuming and require knowledge of the source of the text to be reused.

SUMMARY OF THE INVENTION

The problems identified above are in large part addressed by methods and arrangements of text entry. One embodiment provides a method of text entry. The method may involve selecting segments of text from text files based upon the number of words in phrases of the text files, upon the number of letters in words of the text files, or upon other patterns of the text in the text files. The text files may include web sites and news indexes. The method may also involve indexing the selected segments of text, matching text currently being entered by the user (current text) into an application to a portion of a segment of the indexed text, and entering a remaining portion of the segment of the indexed text into the application based upon the matching. In some embodiments, the current text may be matched to a portion of a single word, and the single word may be entered into the application. In many embodiments, the text may be selected from the text entered into any of several applications. In a few embodiments, the text may be selected from sources specified by a user.

In several embodiments, a user may specify web sites and topics and segments of text may be selected based upon the specification of web sites and topics. In many embodiments, the matching may include determining an attribute of text and matching based upon the attribute. In some further embodiments, the matching may be based upon a time period of text. Current text may be matched to a segment of indexed text based upon a time period of the segment of the text and a time period of the current text. In several further embodiments, the matching may be based upon a source of text. Matching current text to a portion of a segment of the indexed text may include matching the current text to the portion of the segment of the indexed text based upon a source of the segment of the text and a source of text entered by a user. In some embodiments, a user may specify a source of text, and the current text may be matched to portions of segments of text from the source specified by the user. In several further embodiments, the matching may be based upon a recipient of the current text.

BRIEF DESCRIPTION OF TUB DRAWINGS

Advantages of the invention wilt become apparent upon reading the following detailed description and upon reference to the accompanying drawings in which like references may indicate similar elements:

DETAILED DESCRIPTION OF EMBODIMENTS

Figure 1:
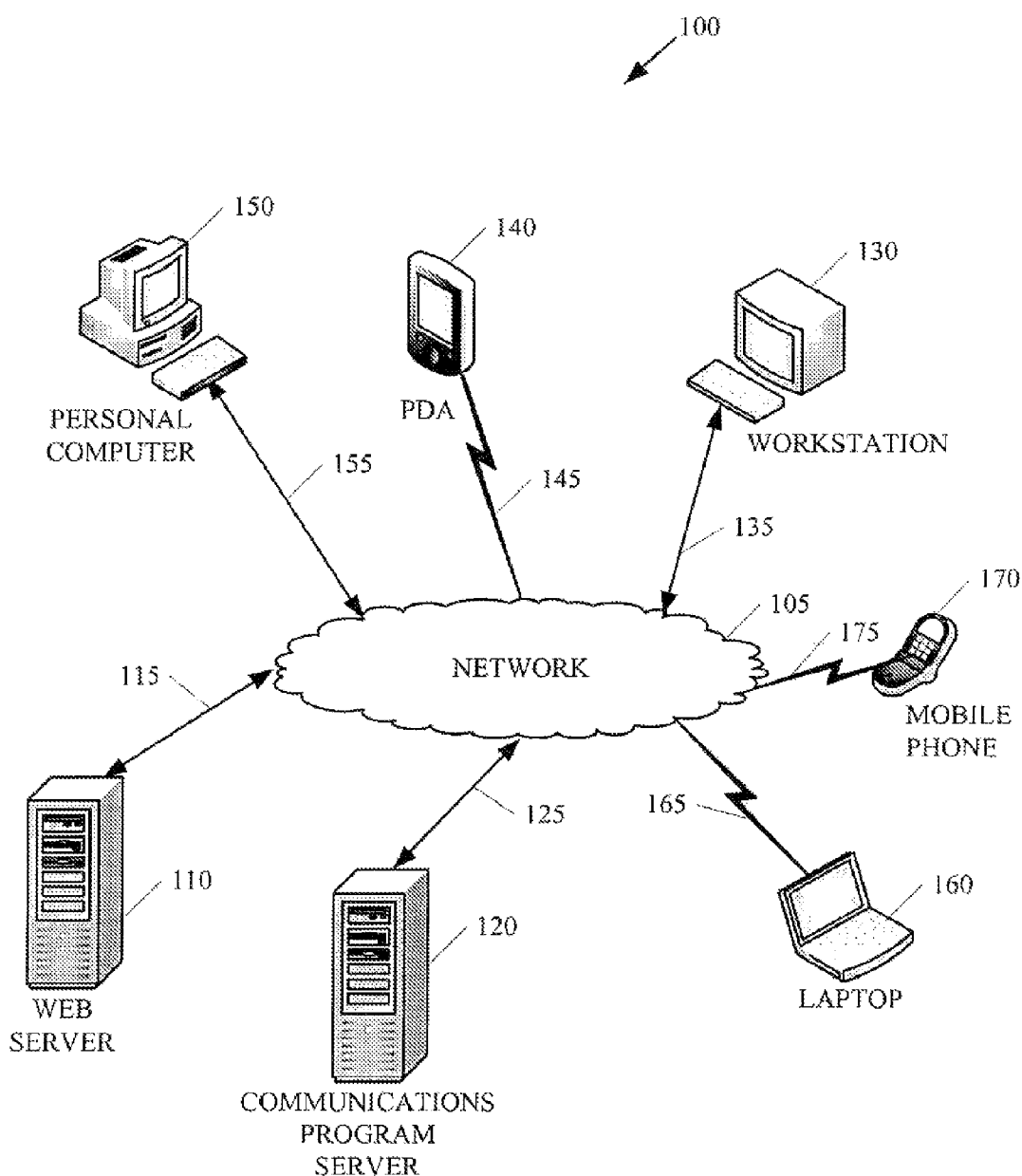
FIG. 1 is a network diagram of an embodiment of devices to enter text into applications.

The following is a detailed description of embodiments of the invention depicted in the accompanying drawings. The embodiments are in such detail as to clearly communicate the invention. However, the amount of detail offered is not intended to limit the anticipated variations of embodiments; but on the contrary, the intention is to cover all modifications, equivalents, and alternatives falling within the spirit and scope of the present invention as defined by the appended claims. The detailed descriptions below are designed to make such embodiments obvious to a person of ordinary skill in the art.

Generally speaking, methods and arrangements of text entry are contemplated. Embodiments include transformations, code, state machines or other logic to select segments of text from text files based upon the number of words in phrases of the text files, upon the number of letters in words of the text files, or upon other patterns of the text in the text flies. The text files may include web sites and news indexes. Embodiments may also involve indexing the selected segments of text, matching text currently being entered by the user (current text) into an application to a portion of a segment of the indexed text, and entering a remaining portion of the segment of the indexed text into the application based upon the matching. In some embodiments, the current text may be matched to a portion of a single word, and the single word may be entered into the application. In many embodiments, the text may be selected from the text entered into any of several applications. In a few embodiments, the text may be selected from sources specified by a user.

In several embodiments, a user may specify web sites and topics and segments of text may be selected based upon the specification of web sites and topics. In many embodiments, the matching may include determining an attribute of text and matching based upon the attribute. In some further embodiments, the matching may be based upon a time period of text. Current text may be matched to a segment of indexed text based upon a time period of the segment of the text and a time period of the current text. In several further embodiments, the matching may be based upon a source of text. Matching current text to a portion of a segment of the indexed text may include matching the current text to the portion of the segment of the indexed text based upon a source of the segment of the text and a source of text entered by a user. In some embodiments, a user may specify a source of text, and the current text may be matched to portions of segments of text from the source specified by the user. In several further embodiments, the matching may be based upon a recipient of the current text.

While specific embodiments will be described below with reference to particular circuit or logic configurations, those of skill in the art will realize that embodiments of the present invention may advantageously be implemented with other substantially equivalent configurations.

FIG. 1 depicts a diagram of an embodiment of a networked system 100 of devices capable of entering text into applications. The system 100 includes a network 105, web server 110 connected to network 105 through wireline connections 115, communications program server 120 connected to network 105 through wireline connection 125, and a variety of devices capable of entering text into applications, including:

workstation 130, a computer coupled to network 105 through wireline connection 135, personal digital assistant 140, coupled to network 105 through wireless connection 145, personal computer 150, coupled to network 105 through wireline connection 155, laptop computer 160, coupled to network 105 through wireless connection 165; and mobile phone 170, coupled to network 105 through wireless connection 175.

The devices 130, 140, 150, 160, and 170 may select segments of text from files containing text (text files). A segment may consist of a word, a phrase, a sentence, a paragraph, or other unit of text. A phrase may consist of a string of words terminated by particular punctuation marks, such as or ",", ";", ".", or "?" by line return. A word may consist of a string of alpha-numeric characters terminated by whitespace or by particular punctuation marks. The text files may include documents authored by a user of the devices, such as email messages and IM; and may include documents created by others, such as web pages, blog entries, pages of shopping sites, and web encyclopedias. The selection may be based upon patterns of the text. The devices may also index the selected text, match text currently being entered by the user into an application to a portion of a segment of the indexed text, and enter a remaining portion of the segment of text into the application based upon the matching. The entering of a remaining portion of a segment in response to matching the portion is called an auto-completion or type-ahead feature.

Network 105, which may consist of the Internet or another wide area network, a local area network, or a combination of networks, may provide data communications among web server 110 and communications program server 120 and the devices 130, 140, 150, 160, and 170. Web server 110 may have installed and operative upon it software to manage a web site or sites. The software may include instructions to generate content and to communicate with visitors to the web site or web sites.

Communications program server 120 may enable users of the devices 130, 140, 150, 160, and 170 to communicate across network 105. In some embodiments, communications program server 120 may provide instant message service. Examples of instant message programs include Microsoft's Windows Messenger, IBM's Lotus Sametime 7.5.1, Yahoo!® Messenger, and AOL's AIM®. Typically, a person at one of the devices 130, 140, 150, 160, and 170 may initiate an instant message chat session by invoking an instant message client program and identifying one or more additional people to participate in the chat session. The initiator may identify other desired participants in the chat session by accessing a directory and selecting individuals or groups of people listed in the directory. The client program may send to the communications program server 120 identifications, such as e-mail addresses, of the other desired participants.

In response, the communications program server 120 may attempt to connect to the client workstations or other computing devices of the other desired participants to determine if they are currently on-line. If communications program server 120 successfully connects with a desired participant, it may create a chat session for the desired participant by invoking the participant's chat session client program and identifying the active members of the chat session. In addition, the communications program server 120 may notify the initiator of the desired participants who are not currently available for a chat session.

Communications program server 120 may then establish communications between the participants. In some implementations of chat client programs, communication between clients is done on a peer to peer level; i.e. directly from a user device such as devices 130, 140, 150, 160, and 170 to another user device without mediation by or assistance from communications program server 120. In other implementations, a message from one participant may be relayed through communications program server 120. In either implementation, a message sent by one participant is sent to all of the other participants and may be displayed on their user devices nearly in real time.

In many embodiments, communications program server 120 may provide email service for users of the devices 130, 140, 150, 160, and 170. Communications program server 120 may contain instructions to receive email messages over network 105, to store the messages, and to upload the messages to the users when they sign in. Communications program server 120 may also contain instructions to receive email messages from the users and forward them on the way to their designated destinations. Examples of email programs include IBM® Lotus Notes® 8, Eudora®, Outlook®, and Outlook Express®.

The arrangement of web server 110 and communications program server 120 and other devices making up the exemplary system illustrated in FIG. 1 is for explanation, not for limitation. Data processing systems useful according to various embodiments of the present invention may omit a server, or may include additional servers, routers, other devices, and peer-to-peer architectures, not shown in FIG. 1, as will occur to those of skill in the art. For example, users may participate in an instant message chat session by establishing peer-to-peer connections or by visiting a web site. Multiple web servers may maintain a single web site or one web server may maintain multiple sites. Multiple servers may provide for email service. For example, a system for providing email may include a separate server or servers for receiving email, such as POP3 servers; and for sending email, such as SMTP servers. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
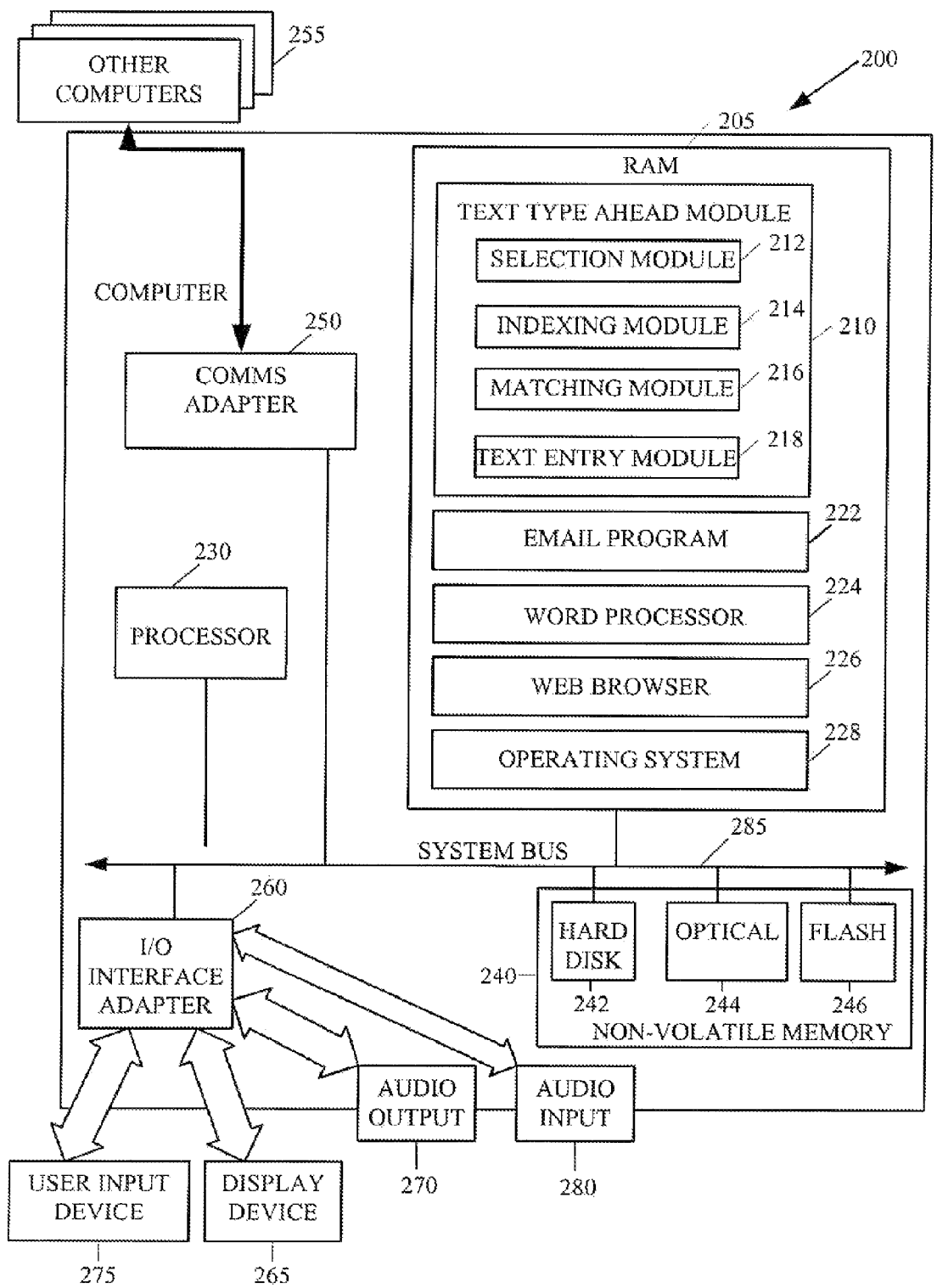
FIG. 2 depicts an embodiment of a computer capable of entering text into applications.

Turning to FIG. 2, depicted is an embodiment of a computer 200 capable of entering text into applications that includes random access memory (RAM) 205, a processor 230 or CPU, non-volatile memory 240, a communications adapter 250, and an Input/Output (I/O) interface adapter 260 connected by system bus 285. Stored in RAM 205 is text type-ahead module 210, email program 222, word processor 224, web browser 226, and operating system 228.

Text type-ahead module 210 may comprise computer program instructions for auto-completing user-entered text. Text type-ahead module 210 includes selection module 212, indexing module 214, matching module 216, and text entry module 218. Selection module 212 may select segments of text from text files. The text files may include files authored by a user of computer 200, such as email and IM messages and address books and other data files. The text files may also include files created by others, such as web pages, blog entries, pages of shopping sites, web encyclopedias, company organization charts and inventory lists.

The selecting may be based upon patterns of text in the text files. The patterns may be based upon the number of words in phrases of the text or upon the number of letters in words of the text. Indexing module 214 may index the selected text. Matching module 216 may match text currently being entered by the user into an application to a portion of a segment of the indexed text, and text entry module 218 may enter a remaining portion of the segment of indexed text into the application based upon the matching.

In the embodiment of FIG. 2, text type-ahead module 210 may constitute a separate program that may provide a type-ahead feature for multiple applications, including email program 222 and word processor 224. Text type-ahead module 210 may select segments of text from multiple sources, including text entered into email program 222 and word processor 224 and text viewed through the web browser 226. Text type-ahead module 210 may gather the selected text into a single repository, index the segments, match the segments against text entered into either of the programs 222 and 224, and enter text into the program. In further embodiments, plug-ins to the programs 222 and 224 may enable text type-ahead module 210 to access text entered into the programs and to auto-complete text entered into the program. A plug-in is an auxiliary program that enhances the capability of another program. The other program may provide a standard interface for plug-ins.

Email program 222 may comprise computer program instruction for sending, receiving, and storing emails. Word processor 224 may comprise computer program instructions for creating and editing text. The computer program instructions may provide for generating windows and processing text that a user may enter into the windows. Operating system 228 may comprise UNIX™, Linux™, Microsoft Windows™, AIX™, or other operating systems useful for auto-completion programs as will occur to those of skill in the art.

The modules shown in RAM 205 are for explanation, not for limitation. In many other embodiments, a text type-ahead module may constitute a module of a single program that accepts text entry. For example, a text type-ahead module may form a component of an IM program and may auto-complete phrases entered into the IM program based upon other text entered into the IM program. In several other embodiments, a text type-ahead module may auto-complete text entered into programs other than word-processing programs and email programs, such as web browsers, instant message programs, and translation programs. For example, a user may begin to enter text for translation into a program. The text type-ahead module may match the text to text previously entered and auto-complete the text entry. The completed entry may then be translated by the translation program.

Text type-ahead module 210, email program 222, word processor 224, web browser 226, and operating system 228 (components of software) are shown in RAM 205 in FIG. 2, but many components of such software may be stored in non-volatile memory 240 also. Further, while the components of such are shown simultaneously present in RAM, in some other embodiments, only some of the components of RAM 205 may be present at any given time.

Non-volatile computer memory 240 may be implemented as a hard disk drive 242, optical disk drive 244, electrically erasable programmable read-only memory space (EEPROM or Flash memory) 246, RAM drives (not shown), or as any other kind of computer memory as will occur to those of skill in the art. Communications adapter 250 may implement the hardware level of data communications through which one computer sends data communications to other computers, such as other computers 255, directly or through a network. The data communications may include transmitting and receiving instant messages and email messages. Such data communications may be carried out serially through RS-232 connections, through external buses such as USB, through data communications networks such as IP networks, and in other ways as will occur to those of skill in the art. Examples of communications adapters include modems for wired dial-up communications, Ethernet (IEEE 802.3) adapters for wired network communications, 802.11a/b/g/n adapters for wireless network communications, and mobile broadband cards.

I/O interface adapter 260 implements user-oriented I/O through, for example, software drivers and computer hardware for controlling output to display devices such as display device 265 and audio output device 270 as well as user input from user input device 275 and audio input device 280. User input device 275 may include both a keyboard and a mouse. Some embodiments may include other user input devices such as speech interpreters, bar code scanners, text scanners, tablets, touch screens, and/or other forms of user input devices. Audio output 270 may include speakers or headphones and audio input device 280 may include a microphone or other device to capture sound.

The computer and components illustrated in FIG. 2 are for explanation, not for limitation. In other embodiments, embedded systems, PDAs, cell phones, BlackBerries® and other devices which accept text entry may select text based upon patterns of the text, index the selected text, match text currently being entered by the user into an application to the indexed text, and enter a phrase of text into the application based upon the matching. In other embodiments, modules to auto-complete text may be implemented in hardware, firmware, or in state machines or may form a component of an operating system. In several embodiments, a computing device may contain two or more processors. In various embodiments, a computing device may use point-to-point interconnects to connect processors or to connect a processor and another element of the computing system.

Figure 3:
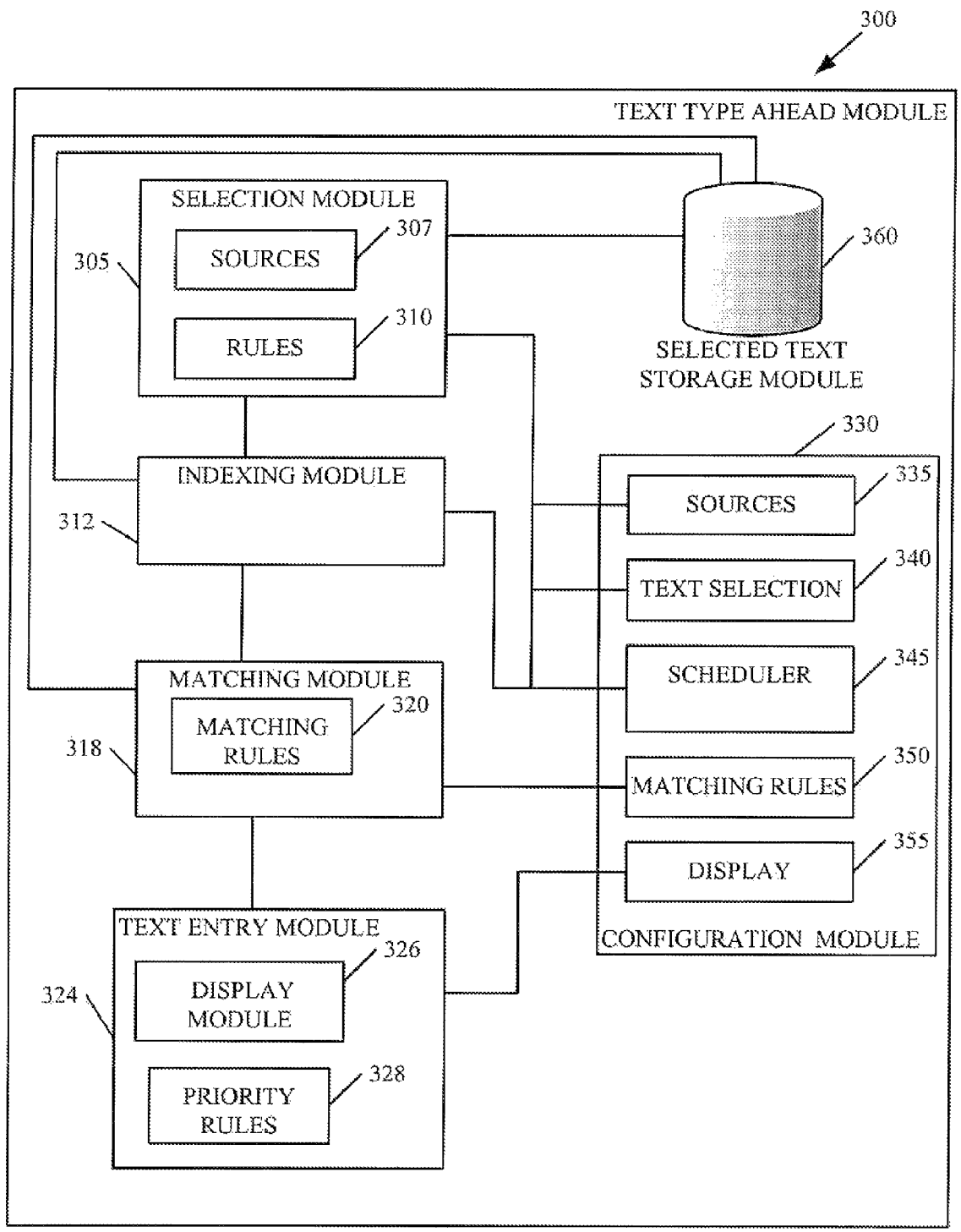
FIG. 3 depicts am embodiment of a text entry apparatus.

FIG. 3 illustrates an embodiment of a text type ahead module 300 that includes a selection module 305, an indexing module 312, a matching module 318, a text entry module 324, a configuration module 330, and a selected text storage module 360. Type-ahead module 300 may select segments of text based upon patterns of the text, index the selected segments of text, match text currently being entered by the user into an application to a portion of a segment of the indexed text, and enter a remaining portion of the segment of text into the application based upon the matching.

Selection module 305 may select text from text files based upon patterns of the text. The text files may include files authored by a user of text type ahead module 300, such as email messages and IM. The text files may also include files created by others, such as text files available from web sites and data files. Web text files may include news sites, blog entries, pages from shopping sites, web encyclopedias, and other web sites. News sites may include sites such as cnn.com and sites that collect news articles (news aggregators). The news aggregators may provide an index of the collected articles or may provide a feed of the entire articles. In some embodiments, selection module 305 may access text from a web site through an external application programming interface (API) provided by the site. The API may implement commands for extracting text from the web site. In many embodiments, a web service may provide access to text from a web site. Web services present a standardized way of integrating web-based applications. Web services typically provide business services upon request through data communications in standardized formats called bindings. A binding is a specification of a data encoding method and a data communications protocol. The most common binding in use for web services is data encoding in XML according to the SOAP protocol and data communications with HTTP. SOAP (Simple Object Access Protocol) is a request/response messaging protocol that supports passing structured and typed data using XML and extensions. In a few embodiments, selection module 305 may access text from a web site by visiting the site to obtain the HTML making up web pages and extracting text from the HTML.

Data files may include address books, organizational charts, inventory lists, and other programs which track data, such as programs providing the time of day. In a few embodiments, selection module 305 may select text from chat windows or word processing documents that have not been saved. Selection module 305 may, for example, leverage memory buffers available in Microsoft Word to process the latest copy of text.

Selection module 305 includes sources 307 and rules 310. In the embodiment of FIG. 3, a user may specify sources of text from which selection module 305 makes selections. Information about these sources may be stored in sources module 307. In some further embodiments, a user of text type ahead module 300 may specify files authored by the user, such as email and IM messages, and address books and other data files. The user may also specify files created by others, such as news sites, blog entries, pages from shopping sites, web encyclopedias, company organization charts and inventory lists. In many further embodiments, a user may specify a cut-off date for text selection. For example, in response to a user specification, selection module 305 may disregard text created in IM chat conferences or on websites more than two months earlier. In several further embodiments, the user may specify directories of files from which to select text created in word-processing programs.

Rules module 310 may apply the rules or patterns used by selection module 305 to select segments of text. The rules or patterns may be based upon the number of words in segments of the text or upon the number of letters in words of the text. Example rules or patterns of segments of text include phrases of four or more words, phrases containing at least two words of five or more characters, or words often or more characters. In some embodiments, the rules or patterns may be based upon other factors. For example, a pattern of text may consist of text that has been entered at least twice into an application whose text is a source for selection module 305.

In the embodiment of FIG. 3, selection module 305 operates as a rule-based pattern matcher, selecting text based upon the rules of rules module 310. In some embodiments, the rules may be represented declaratively, with rules module 310 containing a representation of a set of the rules as data. Selection module 305 may apply the rules to text by processing the data. In other embodiments, rules module 310 may consist of a program into which the rules were hard-coded. Execution of the program with text as data may apply the rules to the text.

Indexing module 312 may index segments of text selected by selection module 305. In some embodiments, the index of a segment of text may consist of the text to which the segment may be matched. In many embodiments, the index of a segment of text is an initial portion of the segment of text. In these embodiments, selection module 305 may match a segment of text to text currently being entered by a user into an application (current text) when the current text is a beginning portion of the selected segment of text. For example, the currently entered text, "Are you on CC" may match the previously entered text "Are you on CCT Dev? It won't accept my connection because someone else is logged on." Conversely, in embodiments which allow matching to the middle of a phrase, indexing module 312 may index a segment of text by multiple portions of the segment. Similarly, in embodiments which require matched words to contain the same characters, with the possible exception of case, an index to a segment may contain exact words from the segment. On the other hand, in embodiments in which a portion of a segment of selected text may match several segments of current text, the indexing to the segment may indicate the range of matches. For example, if the matching rules permit "transmits" to match both "transmit" and "transmitted," then "transmits" may be indexed as "transmit*", where "*" represents any alphanumeric characters. As another example, if the matching rules disregard pronouns and articles, then the index to a segment of text may consist of a beginning segment stripped of pronouns and articles. Under such matching rules, "away from office" may match "I'm away from the office." The former phrase may then be used to index the latter. With this indexing scheme, a matcher may strip pronouns aid articles from the current text and check for the transformed text in the index.

Matching module 318 matches current text to previously entered text. The previously entered text includes text indexed by indexing module 312. In some embodiments, previously entered text may also include text that has not yet been indexed; for example, because it was entered after the most recently scheduled operation of indexing module 312. In further embodiments, the previously entered text may include text contained in a window currently on display. For example, in some further embodiments, matching module 318 may match text currently being entered into a chat window of an IM program to text previously entered into an open chat window of another IM program. In some embodiments, a user may invoke a command to activate matching module 318. The user may, for example, activate matching module 318 by hitting a key combination such as Ctrl-Space or Ctrl-Tab. In many embodiments, matching module 318 may begin operation only after a user has entered a minimum number of characters, such as 7, into a current application. In alternative embodiments, matching module 318 may begin matching, but display module 326 may not display possible completions and text entry module 326 may not enter text until the user has entered the minimum number of characters.

Matching module 318 includes matching rules 320. Matching rules 320 may define a match between current text and indexed text. Typically, the two match when the current text is a beginning portion of the indexed text. For example, the currently entered text, "Are you on CC" may match the previously entered text "Are you on CCT Dev? It won't accept my connection because someone else is logged on." In the above example, the current text is exactly the same as a beginning portion of the previously entered text. In other embodiments, the beginning portion and the current text need not be identical for the phrases to match. For example, whitespace and other non-alpha-numeric characters may be disregarded. "Hi there" may match "Hi, there." Similarly, the rules of matching rules 320 may disregard case. For example, in some embodiments, "Are you on CC" may match "are you on cct dev?"

In some embodiments, the rules of matching rules 320 may be less strict. In some further embodiments, words with the same stem may match. For example, "rules" may match "ruled" or "dictator" may match "dictatorship." In a few embodiments, the rules of matching rules 320 may disregard some words in finding matches. The rules may, for example, disregard pronouns and articles. In these embodiments, "away from office" may match "I'm away from my office. Please contact XXX in case of emergency." In several embodiments, the rules of matching rules 320 may disregard short words, such as words of three characters or fewer. In many embodiments, a user may specify the rules contained in matching rules 320.

Text entry module 324 may enter text into a document. Matching module 318 may match text being entered by a user into the document (current text) to a portion of a segment of indexed text. Text entry module 324 may then enter the remaining portion of the segment of indexed text into the document. When the portion of the segment of text matched to the current text is the beginning portion of the segment of text, the entry of the remaining portion amounts to auto-completion of the current text.

Text entry module 324 includes display module 326 and priority rules module 328. Display module 326 may display matching segments of text to a user through a user interface. A text display may include an entire segment of text that matches current text, the remaining portion of text, or something in between. For example, if the user has typed "Are you on CC," and that current text is matched "Are you on CCT Dev?" the display may consist of the entire matching text "Are you on CCT Dev?" the remaining portion "T Dev?" or "CCT Dev?" In some embodiments, display module 326 may display possible completions in a floating window. In many of these embodiments, auto-completion module 300 is a stand-alone application that provides auto-completion for multiple other applications. In other embodiments, display module 326 may display the possible completions in-line, in the same window or other display mechanism in which the user is entering text into the document. An in-line display may consist of a scrollable window, drop-down menu bar, or other display mechanism known to those of skill in the art.

The user may select a matching segment of text for entry of the remaining portion into the application. Alternatively, the user may continue typing to further restrict the list of matching segments. In some embodiments, if there is only one possible match, text entry module 324 may automatically enter the text into the application without selection by the user.

Priority rules module 328 may contain rules for the order of display of possible matches. Priority rules module 328, together with selection module 305, indexing module 312, and matching module 318, may attempt to display first the remaining portions of segments of text most likely to be selected by a user. In some embodiments, priority rules module 328 may determine an attribute of text and may base the order of display of potential matches on the attribute. Attributes of text may include frequency of appearance in news indices or other sources, location, time period or currency, subject matter, source, and target or recipient. For example, in some embodiments, priority rules module 328 may rate the indexed segments of text by the number of times they appear in news indices. Segments that appear in more indices will be displayed before segments that appear in fewer indices.

In some embodiments, priority rules module 328 may determine a location of a segment of indexed text and may give priority to those segments which match a current location of the user's computing device. In some further embodiments, priority rules module 328 may assign to segments of text extracted from a regional article the region of origin of the article as their location. For example, news from a West Virginia web paper may be assigned the location of West Virginia. The location of a user's computer may be determined from an IP mapping, and the location of a user's mobile device may be determined from techniques such as GPS, IP, and cellular tower triangulation.

In some embodiments, priority rules module 328 may base the priority of matching segments of indexed text on a time period. In further embodiments, the time period of text may measure how current the text is. For example, yesterday's news may be of a different time period than breaking news. In some further embodiments, priority rules module 328 may determine the time period of indexed text from its time of origin. Text from a web page may be dated according to its publication date. The time period of text currently being entered by a user into an application may be determined by an examination of the pattern of word usage of the user. The examination may determine whether the user usually selects words from yesterday's news—i.e., they are a newspaper reader—or the user usually selects words from the latest breaking news. In these further embodiments, priority rules module 328 may give priority to matching segments of indexed text of the same time period or currency as the words selected by the user.

In a few embodiments, priority rules module 328 may base the priority of matching segments of indexed text on the source of the text. In further embodiments, priority rules module 328 may determine a source of the words entered by a user and may give priority to matching segments from the same sources. For example, priority rules module 328 may rank terms from a particular website, or even a particular section of a website, higher than terms from other websites. In some further embodiments, priority rules module 328 may study the pattern of words entered by a user to determine the sources. For example, priority rules module 328 may determine that the user usually selects words that come from CNN.com or a section of another news site. In other further embodiments, a user may specify sources to receive preference. In many further embodiments, priority rules module 328 may assign as the source of text the program creating the text. For example, when a user enters text into an IM chat window, priority rules module 328 may first display selections from other IM chats with the other participant or participants. In some embodiments of type ahead modules used with IM programs, searching, indexing, and display may be executed in the following order:

existing memory/cache
    latest IM chat history/window
      opened/frequently used IM source repository (e.g. Sametime 7.5.1 and MSN IM are both in use).

In some further embodiments, selection module 305 may assign a source to text during the selection process. For example, when selection module 305 selects text from a website, it may tag the text with an identification of the website.

Priority rules module 328 may include a learning feature. In some embodiments, for example, priority rules module 328 may monitor a user's selections of matches to an item of current text. Priority rules module 328 may then display potential matches in order of frequency of selection, with the most often selected shown at the top of list, the next most often selected shown second, etc.

Configuration module 330 may configure the other modules of auto completion module 300. Configuration module 330 includes source module 335, text selection module 340, scheduler 345, matching rules module 350, and display module 355. Configuration module 330 may receive specifications from a user about parameters for the operation of the other submodules of auto-completion module 300 and may set the parameters. Source module 335 may receive specifications and set parameters about the source of text for indexing and matching, such as websites, blogs, news indices, specific directories of word-processing documents, expiration dates for selection and indexing, and auxiliary programs that provide data that may be used in text entry. Text selection module 340 may receive specifications and set rules describing the patterns of text to be indexed, such as phrases of at least four words or words of at least ten characters. Scheduler 345 may receive information about the scheduling of selection module 305 and indexing module 312 and may set their schedules. Matching rules module 350 may receive specifications of matching rules for matching module 318. Display module 355 may set parameters regarding the display of display module 326. The parameters may, for example, govern the order in which to show possible completions, whether to automatically enter the only possible completion, and the minimal number of characters to be entered before possible completions are shown.

Selected text storage module 360 may store segments of text selected by selection module 305 and indices created by indexing module 312. Selected text storage module 360 may be accessed by matching module 318 for segments of text that match current text. Matching module 318 may pass the matches on to text entry module 324 for display through display module 326 and entry in applications. In some embodiments, selected text storage module 360 may also store attributes of the segments of text, such as their source or their creation date.

FIG. 3 is for illustration and not limitation. Some embodiments of a type-ahead module may omit some of the feature shown and many embodiments may include additional features. For example, some type-ahead modules may omit a configuration module. Many type-ahead modules may omit a selected text storage. For example, type-ahead modules which are a component of a single application may use the storage of the application. Similarly, in other embodiments of a type-ahead module, the division of functionality between modules may differ from the division shown in FIG. 3. Functions of several modules may be combined in one module, or functions of one module may be split among several.

Figure 4:
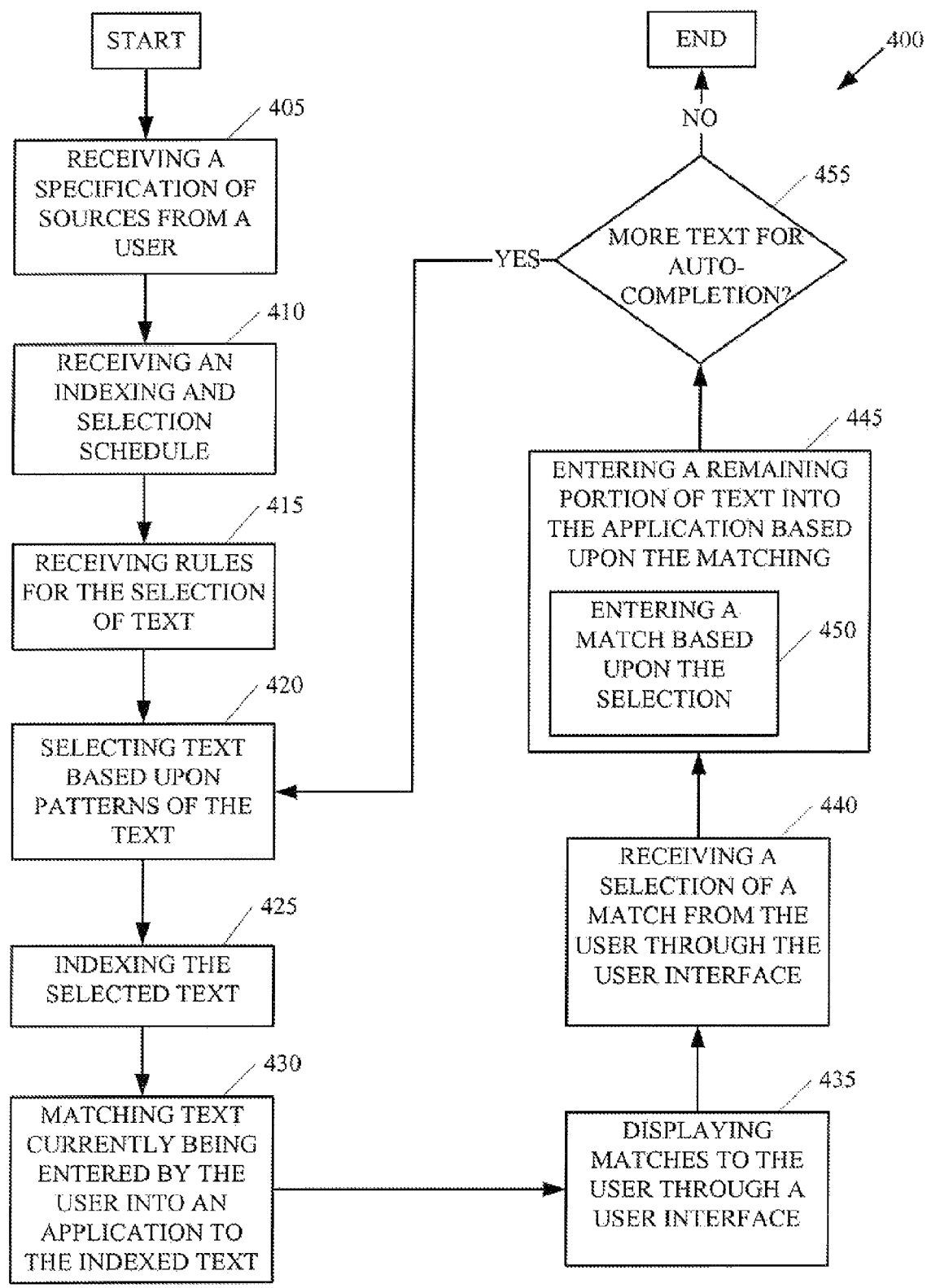
FIG. 4 is a flowchart of an embodiment of a method to enter text into applications.

FIG. 4 depicts a flowchart of an embodiment of a method to auto-complete text. The method may be performed by an apparatus such as type-ahead module 300 of FIG. 3. Flowchart 400 of FIG. 4 begins with receiving a specification of sources of text from a user (element 405). The sources may include text files authored by a user of the devices. The text files may include messages, such as email and IM messages; and may include data files, such as address books. The sources may also include files created by others, such as news sites, blog entries, pages from shopping sites, web encyclopedias, company organization charts, and inventory lists. In some embodiments, the specification of sources may include a cut-off date for using previously entered text for auto-completion; directories of word processing documents; or programs or data files with information the user may wish to reference, such as address books or organizational charts.

The method may include receiving an indexing and selection schedule (element 410). This schedule may determine how often to select segments of text from text files and how often to index the phrases for use in auto-completing text. Typical schedules may be daily, every few days, or weekly. A scheduled selection and indexing may, however, be postponed if current I/O usage is high.

The method may include receiving rules for the selection of patterns of text (element 415). The rules may be based upon the number of words in phrases or upon the number of letters in words. The rules may also be based on other attributes of the text. For example, in some embodiments, text may be selected for use in auto-completion only if the text is found at least twice in the sources of text. A module such as type-ahead module 300 of FIG. 3 may apply the rules to select text from, the specified sources. As a result, the text may be selected based upon patterns of the text (element 420). In some embodiments, the content of rules supplied by users may not provide the exclusive criteria for text selection. In some further embodiments, a type-ahead module may apply default rules in the absence of rules entered by a user. In many further embodiments, a type-ahead module may select text based upon built-in rules.

The method may include indexing the selected text (element 425). The indexing may be based upon the methods of matching used in element 430. For example, current text may match indexed text when the current text forms the beginning of the indexed text. In such cases, the indexed text may be indexed by the beginning phrase. In some embodiments, a word in current text may match a word in indexed text if the words have the same stem. In such cases, the index to the indexed text may contain the stem of the word.

The method may include matching current text to a portion of a segment of indexed text (element 430). In some embodiments, the matching may consist of searching for indexed text with the same beginning as the current text. In many embodiments, the portion of indexed text may not be identical to the current text. For example, words with the same stem may match, or articles may be ignored in finding a match.

The method may include displaying matches to the user through a user interface (element 435). The matches may consist of segments of text that begin with the current text. In some embodiments, the display may be in-line, as part of the display of the application into which the user is entering text. In other embodiments, the display may be in a floating window.

The user may select one of the indicated matches through the user interface (element 440). The user may, for example, click on a match and hit ENTER or TAB. A type-ahead apparatus may enter a remaining portion of text into the application based upon the matching (element 445). For example, if a match is to an initial portion of a segment of text, the apparatus may enter the remainder of the segment. The segment may be the segment selected by the user (element 450), or a modification of the segment, if exact matches are not required. In some embodiments, the user may then treat the text as other user-entered text. The user may perform direct in-line actions such as search, edit, copy or paste.

If the user enters additional text into an application which provides for auto-completion, elements 420 through 450 may be repeated (element 455). Otherwise, the method of flowchart 400 may end.

The method of flowchart 400 may enable a user to efficiently enter previously typed text into a text-entry window without undergoing the laborious cut-and-paste process described in the Background section. The user may recall the previously typed text by typing a few characters of the text, such as the first few words. The method may also enable a user to recall contact information for a person by typing a few characters from the person's name into the application the user is currently working with.

The elements of flowchart 400 are for illustration and not for limitation. In alternative embodiments, additional elements may be included, some of the elements of flowchart 400 may be omitted, or the elements may be performed in a different order. For example, embodiments which provide auto-completion for a single application may omit element 405. Some embodiments may omit some or all of elements 410, 415, and 420, using fixed procedures that are not configurable by a user.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product for auto-completion of text, the computer program product accessible from a computer-usable or computer-readable storage device providing program code for use by or in connection with a computer or any instruction execution system. For the purposes of this description, a computer-usable or computer readable storage device can be any apparatus that can store the program for use by or in connection with the instruction execution system, apparatus, or device.

The storage device can be an electronic, magnetic, optical, or semiconductor system (or apparatus or device). Examples of a computer-readable storage device include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

It will be apparent to those skilled in the art having the benefit of this disclosure that the present invention contemplates methods and arrangements for text type-ahead. It is understood that the form of the invention shown and described in the detailed description and the drawings are to be taken merely as examples. It is intended that the following claims be interpreted broadly to embrace all the variations of the example embodiments disclosed.

Although the present invention and some of its advantages have been described in detail for some embodiments, it should be understood that various changes, substitutions and alterations can be made herein without departing from the spirit and scope of the invention as defined by the appended claims. Although an embodiment of the invention may achieve multiple objectives, not every embodiment falling within the scope of the attached claims will achieve every objective. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of text entry, the method comprising:
a computer selecting segments of text from text documents including web pages, wherein each of the selected segments of text adheres to at least one of one or more patterns of text, wherein each of the one or more patterns specifies one or more of a range of numbers of words in phrases of text and a range of numbers of letters in words of text, and wherein at least one of the one or more patterns specifies a minimum number of words in phrases of text;

the computer indexing the selected segments of text;

the computer matching text entered by a user into an application to one or more portions of one or more segments of the indexed selected segments of text;

the computer determining a priority ordering for the one or more segments of the indexed selected segments of text;

the computer displaying the one or more segments of the indexed selected segments of text to the user based upon the priority ordering;

the computer selecting or receiving a selection of one of the one or more segments of the indexed selected segments of text; and the computer entering a remaining portion of the selected one of the one or more segments of the indexed selected segments of text into the application, wherein the computer matching the text entered by the user into the application to the one or more portions of the one or more segments of the indexed selected segments of text comprises:

the computer determining an attribute of an attribute segment of the one or more segments of the indexed selected segments of text;

the computer determining an attribute of the text entered by the user into the application; and the computer matching the text entered by the user into the application to a portion of the attribute segment based upon the determined attribute of the attribute segment and the determined attribute of the text entered by the user into the application, wherein the computer determining the attribute of the attribute segment comprises the computer determining a geographical location of an origin of the attribute segment, and wherein the computer matching the text entered by the user into the application to the portion of the attribute segment comprises the computer matching the text entered by the user to the portion of the attribute segment based upon the determined geographical location of the origin of the attribute segment and a location of a computing device into which the text is entered by the user.

2. The method of claim 1, wherein the computer selecting the segments of text from text documents comprises the computer selecting at least one of the segments of text from a news index.

3. The method of claim 1, further comprising:
the computer receiving from the user a specification of web sites and a specification of topics,
wherein the computer selecting the segments of text from text documents comprises the computer selecting the segments of text from the web sites based upon the specification of the web sites and the specification of the topics.

4. The method of claim 1,
wherein the computer determining the attribute of the attribute segment comprises the computer determining a time period of the attribute segment; and
wherein the computer matching the text entered by the user into the application to the portion of the attribute segment comprises the computer matching text entered by the user to the portion of the attribute segment based upon the determined time period of the attribute segment and a time period of the text entered by the user.

5. The method of claim 1,
wherein the computer determining the attribute of the attribute segment text comprises the computer determining a source of the attribute segment; and
wherein the computer matching the text entered by the user into the application to the portion of the attribute segment comprises the computer matching the text entered by the user to the portion of the attribute segment based upon the determined source of the attribute segment and a source of text entered by the user.

6. The method of claim 1, further comprising:
the computer receiving from the user a specification of a source of text,
wherein the one or more segments of the indexed selected segments of text are from the source specified by the user.

7. The method of claim 1, wherein the computer matching the text entered by the user into the application to the one or more portions of the one or more segments of the indexed selected segments of text comprises the computer matching a stem of a word of text entered by the user into the application to a stem of a word of one of the one or more segments of the indexed selected segments of text, wherein the user word differs from the stem of the indexed word.

8. The method of claim 1, wherein the computer matching the text entered by the user into the application to the one or more portions of the one or more segments of the indexed selected segments of text comprises:
the computer matching a first word of the text entered by the user into the application (user text) to a first word of a portion of a segment of the indexed selected segments of text; and
the computer matching a second word of the user text to a second word of the portion of the segment of the indexed selected segments of text,
wherein the portion of the segment of the indexed selected segments of text contains an article between the first word of the portion of the segment of the indexed selected segments of text and the second word of the portion of the segment of the indexed selected segments of text; and
wherein the user text does not contain an article between the first word of the user text and the second word of the user text.

9. The method of claim 1, wherein the computer matching the text entered by the user into the application to the one or more portions of the one or more segments of the indexed selected segments of text comprises the computer matching the text entered by the user into the application to a middle portion of one of the one or more segments of the indexed selected segments of text.

10. The method of claim 1, wherein the minimum number of words in phrases of text are specified by the user.

11. The method of claim 1, wherein the computer selecting the segments of text from the text documents comprises the computer selecting one of the segments of text from one of the text documents, wherein the selected one segment of text adheres to one of the one or more patterns of text, the one of the one or more patterns of text specifying the range of numbers of words in phrases of text and the range of numbers of letters in words of text.

12. The method of claim 1, further comprising:
before the computer selecting the one of the one or more segments of the indexed text, the computer receiving from the user a specification of the one of the one or more segments of the indexed text.

13. The method of claim 1,
wherein the one or more segments of the indexed selected segments of text displayed to the user comprises a single segment of text; and
wherein the computer selecting the one of the one or more segments of the indexed selected segments of text comprises the computer selecting the single segment of text.

14. The method of claim 1, wherein:
the computer selecting the segments of text from the text documents including web pages comprises the computer selecting the segments of text from the text documents including the web pages based solely on each of the selected segments of text adhering to at least one of the one or more patterns of text.

15. A computer program product comprising one or more computer-readable tangible storage devices and computer-readable program instructions which are stored on the one or more storage devices and when executed by one or more processors, perform the method of claim 1.

16. A computer system comprising one or more processors, one or more computer-readable memories, one or more computer-readable tangible storage devices and program instructions which are stored on the one or more storage devices for execution by the one or more processors via the one or more memories and when executed by the one or more processors perform the method of claim 1.

17. A computer system for entering text into an application, the computer system comprising:
one or more processors, one or more computer-readable memories and one or more computer-readable tangible storage devices;
program instructions, stored on at least one of the one or more storage devices for execution by at least one of the one or more processors via at least one of the one or more memories, to select segments of text from text documents including web pages, wherein each of the selected segments of text adheres to at least one of the one or more patterns of text, wherein each of the one or more patterns specifies one or more of a range of numbers of words in phrases of text and a range of numbers of letters in words of text, and wherein at least one of the one or more patterns specifies a minimum number of words in phrases of text;
program instructions, stored on at least one of the one or more storage devices for execution by at least one of the one or more processors via at least one of the one or more memories, to index the selected segments of text;
program instructions, stored on at least one of the one or more storage devices for execution by at least one of the one or more processors via at least one of the one or more memories, to match text entered by a user into an application to one or more portions of one or more segments of the indexed selected segments of text;
program instructions, stored on at least one of the one or more storage devices for execution by at least one of the one or more processors via at least one of the one or more memories, to determine a priority ordering for the one or more segments of the indexed selected segments of text;
program instructions, stored on at least one of the one or more storage devices for execution by at least one of the one or more processors via at least one of the one or more memories, to display the one or more segments of the indexed selected segments of text to the user based upon the priority ordering;
program instructions, stored on at least one of the one or more storage devices for execution by at least one of the one or more processors via at least one of the one or more memories, to select or receive a selection of one of the one or more segments of the indexed selected segments of text; and
program instructions, stored on at least one of the one or more storage devices for execution by at least one of the one or more processors via at least one of the one or more memories, to enter a remaining portion of the selected one of the one or more segments of the indexed selected segments of text into the application,
wherein the program instructions to determine the priority ordering for the one or more segments of the indexed selected segments of text:
determine a geographical location of an origin of each of the one or more segments of the indexed selected segments of text; and
determine the priority ordering for the one or more segments of the indexed selected segments of text based upon the attribute, the geographical location of the origin of each of the one or more segments of the indexed selected segments of text, and a location of a computing device into which the text entered by the user was entered.

18. The computer system of claim 17, further comprising:
program instructions, stored on at least one of the one or more storage devices for execution by at least one of the one or more processors via at least one of the one or more memories, to receive a specification of web sites and a specification of topics from the user; and wherein
the program instructions to select the segments of text from text documents select the segments of text from the web sites based upon the specification of the web sites and the specification of the topics.

19. The computer system of claim 17, wherein the program instructions to match the text entered by the user into the application receive from the user a specification of a repository of segments of text from text files and match the text entered by the user into the application to the one or more portions of the one or more segments of the indexed selected segments of text contained in the repository specified by the user.

20. A computer program product to enter text, the computer program product comprising:
one or more computer-readable tangible storage devices;
program instructions, stored on at least one of the one or more storage devices, to select segments of text from text documents including web pages, wherein each of the selected segments of text adheres to at least one of one or more patterns of text, wherein each of the one or more patterns specifies one or more of a range of numbers of words in phrases of text and a range of numbers of letters in words of text, and wherein at least one of the one or more patterns specifies a minimum number of words in phrases of text;
program instructions, stored on at least one of the one or more storage devices, to index the selected segments of text;
program instructions, stored on at least one of the one or more storage devices, to match text entered by a user into an application to one or more portions of one or more segments of the indexed selected segments of text;
program instructions, stored on at least one of the one or more storage devices, to determine a priority ordering for the one or more segments of the indexed selected segments of text;
program instructions, stored on at least one of the one or more storage devices, to display the one or more segments of the indexed selected segments of text to the user based upon the priority ordering;

program instructions, stored on at least one of the one or more storage devices, to select or receive a selection of one of the one or more segments of the indexed selected segments of text; and program instructions, stored on at least one of the one or more storage devices, to enter a remaining portion of the selected one of the one or more segments of the indexed selected segments of text into the application, wherein the program instructions to determine the priority ordering for the one or more segments of the indexed selected segments of text:

determine a geographical location of an origin of each of the one or more segments of the indexed selected segments of text; and determine the priority ordering for the one or more segments of the indexed selected segments of text based upon the attribute, the geographical location of the origin of each of the one or more segments of the indexed selected segments of text, and a location of a computing device into which the text entered by the user was entered.

21. The computer program product of claim 20, further comprising:

program instructions, stored on at least one of the one or more storage devices, to receive from the user a specification of web sites and a specification of topics, wherein the program instructions to select the segments of text from text documents including web pages select the segments of text from the web sites based upon the specification of web sites and the specification of topics.

* * * * *